Nov. 28, 1939.   R. W. AYER   2,181,258
OPERATING DEVICE FOR CONTROL SURFACES FOR AIRPLANES
Filed Oct. 27, 1937   2 Sheets-Sheet 1
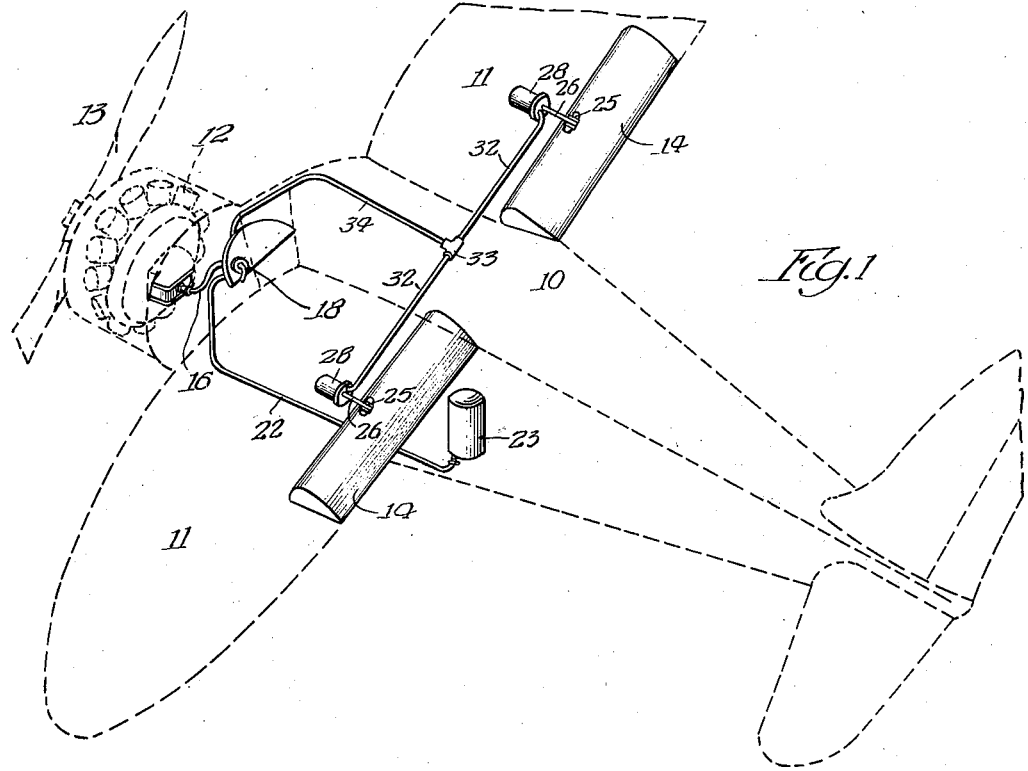
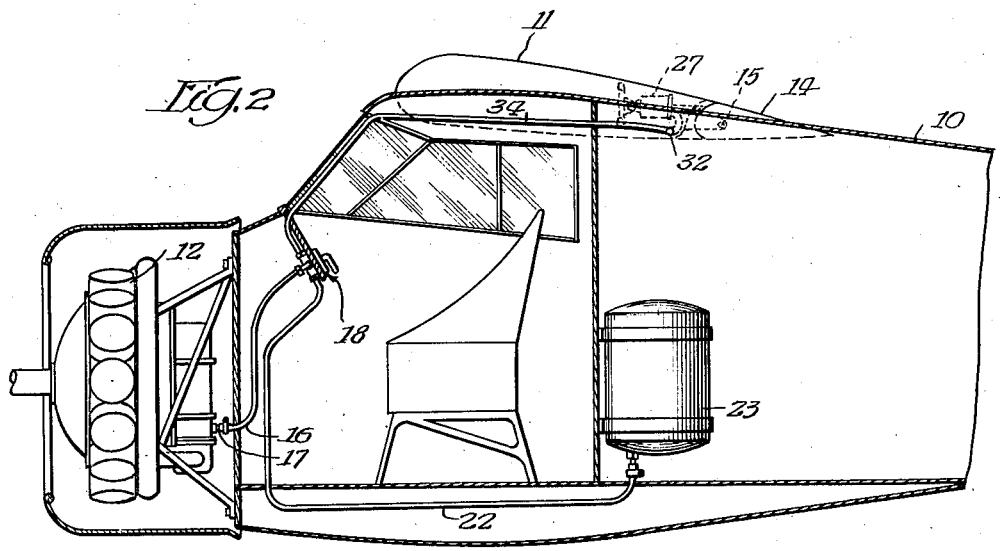
Inventor:-
Robert W. Ayer
By Fred Gerlach
his Atty.

Nov. 28, 1939.  R. W. AYER  2,181,258
OPERATING DEVICE FOR CONTROL SURFACES FOR AIRPLANES
Filed Oct. 27, 1937  2 Sheets-Sheet 2
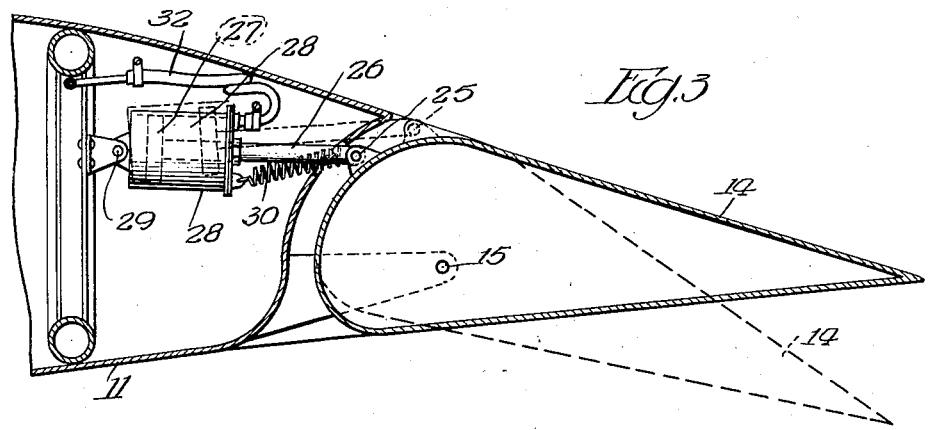
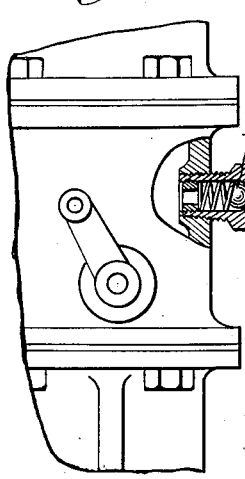
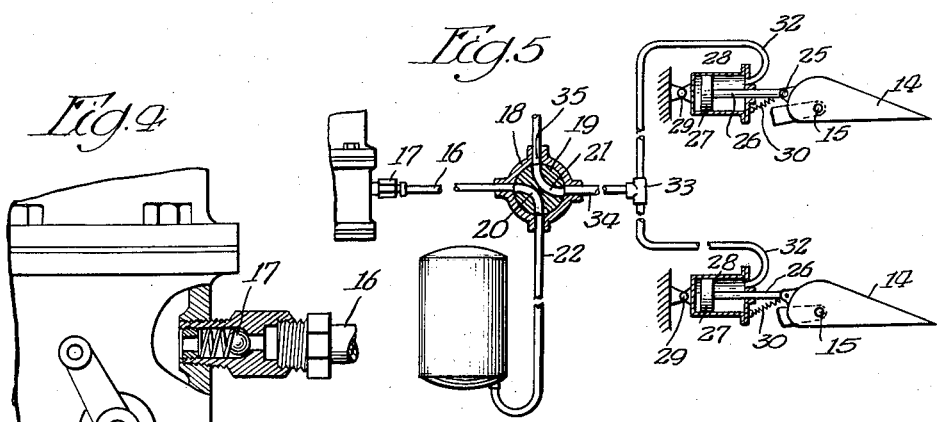
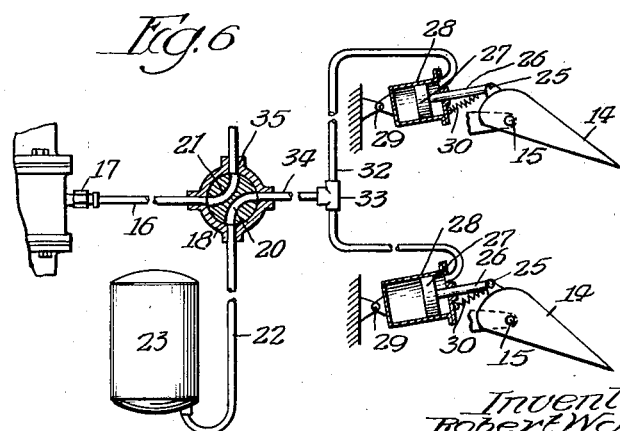

Patented Nov. 28, 1939

2,181,258

UNITED STATES PATENT OFFICE 2,181,258

OPERATING DEVICE FOR CONTROL SURFACES FOR AIRPLANES

Robert W. Ayer, Wayne, Mich., assignor, by mesne assignments, to Aviation Manufacturing Corporation, Chicago, Ill., a corporation of Delaware Application October 27, 1937, Serial No. 171,219

2 Claims. (Cl. 244—42)

The invention relates to operating devices for flaps or control surfaces for airplanes.

It is now common practice to use flaps or adjustable control surfaces for controlling or retarding or lifting an airplane.

One object of the invention is to provide improved means for shifting the flaps or control surfaces under control of the pilot but without requiring him to supply force required for shifting them.

Another object of the invention is to provide improved means for shifting the flaps by suction derived from the in-take of the airplane engine which includes means for operating the flaps by suction when the engine is idle.

Other objects of the invention will appear from the detail description.

The invention consists in the several novel features which are hereinafter set forth and are more particularly defined by claims at the conclusion hereof.

In the drawings: Fig. 1 is a diagrammatic perspective of an airplane equipped with the invention. Fig. 2 is a vertical section of the airplane. Fig. 3 is a section through a wing and a flap illustrating the vacuum-cylinder and the connection for operating the flap. Fig. 4 is a section illustrating the check-valve connection between the engine-intake and the pilot's control valve. Fig. 5 is a diagram illustrating the position of the pilot's control valve when the flaps are in normal position. Fig. 6 is a similar view illustrating the flaps and their shifting mechanism when the flaps are lowered.

The invention is exemplified as applied to an airplane which comprises a suitable body or fuselage 10, wings or main lift airfoils 11, an internal combustion engine 12 for driving a propeller 13 and a pair of flaps or auxiliary control surfaces 14 which are pivotally supported at 15 to swing downwardly from the trailing edges of the wings, respectively, to retard the airplane in gliding or landing, as well understood in the art.

The power means for shifting the flaps 14 to lower or adjust them into their effective or high-lift position comprises a pipe 16 which leads from the casing of a check-valve 17 which is connected to the intake manifold of the airplane engine and is subjected to suction. The check-valve is opened by the suction produced by the combustible fluid passing to the engine to evacuate the pipe 16. Valve 17 is adapted to automatically close and thereby retain the vacuum in the pipe 16 when there is no suction in the intake manifold. Pipe 16 leads to the casing of a pilot's control valve 18 which comprises a plug 19 which is rotatable in the casing and is provided with two arcuate 90° ports 20, 21. A pipe 22 leads from the casing of valve 18 to a vacuum storage tank 23 which is suitably mounted in any convenient and available portion of the plane. While port 20 is set by the pilot to establish communication between pipe 16 from the intake manifold and pipe 22 between the valve and tank 23 (Fig. 5) and the engine is running, the suction in the intake manifold will exhaust the air from tank 23 and produce a vacuum therein. The capacity of tank 23 is sufficient for a series of operations of the flap-shifting mechanism, as hereinafter described, and its purpose is to provide a source of vacuum which is usable when the engine is not in operation or for a succession of operations at times when the vacuum available from the intake manifold may be insufficient for that purpose.

Each flap 14 is connected as at 25 to the stem 26 of a piston 27 which is slidably mounted in a cylinder 28. Each cylinder 28 is pivoted at 29 to any suitable part, such as a spar, of the wing-frame. This piston and stem are adapted to shift the flap 14 downwardly into position indicated by dotted lines in Fig. 3 when the outer side of the piston is subjected to vacuum. A spring 30 is applied between cylinder 28 and pivot 25, which connect stem 26 and flap 14, to normally hold the flap in its raised position and the piston 27 at the inner end of cylinder 28. Pipes 32 lead from the outer end of cylinders 28, respectively, to a T-fitting 33 which is connected to the casing of valve 18 by a pipe 34. When port 21 is in position illustrated in Fig. 5, the cylinders 28 will be in communication with atmosphere through pipes 32, fitting 33, pipe 34 and port 21 and an air-inlet 35 in the casing of valve 18. At such time, springs 30 will be effective to pull the pistons 27 towards the inner ends of cylinders 28 and hold the flaps 14 in their raised position. When the valve-plug 19 is shifted by the pilot, into the position shown in Fig. 6, port 21 will connect pipe 16 with the air-inlet 35 and disconnect the suction-pipe 16 from pipe 22 and tank 23. Air can then enter the manifold through inlet 35, port 21, pipe 16 and check-valve 17. When the pilot desires to lower the flaps he will set valve-plug 19 into the position shown in Fig. 6. Vacuum tank 23 will then be connected to cylinders 28 through port 20. Vacuum from the tank will be applied to the outer ends of cylinders 28, through pipes 32, fitting 33, pipe 34, port 20 and pipe 22. This will cause the pistons 27 to be moved outwardly so they will operate stems 26 and swing the flaps 14 downwardly into their operative position. So long as valve 18 remains in said position, the flaps will remain in their lowered or operative position. When the valve 18 is shifted from the position shown in Fig. 5 to the position shown in Fig. 6, the vacuum will be cut off from cylinders 28 and air will be admitted thereto through inlet 35, port 21, pipes 34 and 32, whereupon the springs 30 will become effective to restore the flaps 14 to their normal or lifted position. In operation, while the airplane is in flight, and the flaps are not to be used, the pilot will set the valve 18 into the position shown in Fig. 5. The internal combustion engine will build up a vacuum in the tank 23 through pipes 22, port 20, pipe 18 and check-valve 17 from the intake manifold of the engine. The purpose of the tank is to provide a sufficient supply of vacuum which will be available for repeated operations of the flaps in the event that such should become necessary. Whenever the flaps are to be lowered, the pilot will rotate valve-member 19 from the position shown in Fig. 5 to that shown in Fig. 6. This will disconnect the engine intake from the pipe 22 and vacuum tank 23 and connect the vacuum tank to the cylinders 28 so that the outer side of the pistons 27 will be subjected to sufficient suction to operate stems 26 and swing the flaps 14 against the force of springs 30 into their lowered or operative position. When the flaps are to be lifted the pilot will return the valve to the normal position shown in Fig. 5, whereupon the vacuum in the cylinders 28 will be released through the admission of air at inlets 35 and springs 30 will retract the flaps to their normal position, and the engine will again build up the vacuum in the tank 23 for subsequent operations.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In an aircraft, the combination with an internal combustion engine and a variable airfoil of a suction-operable structure comprising a piston and cylinder for shifting the variable airfoil, a vacuum-tank connected to be exhausted from the intake of the engine, and a valve for conjointly controlling the connection between the engine and the tank and the tank and the structure, said valve being provided with means for cutting off the tank from the engine and for delivering vacuum to and releasing the vacuum in the structure independently of the engine.

2. In an aircraft, the combination with an internal combustion engine and a plurality of variable airfoils of a plurality of suction-operable structures each comprising a piston and cylinder for shifting a variable airfoil, a vacuum-tank connected to be exhausted from the engine intake, said cylinders and pistons being pivoted to the wing-structure and the airfoils, respectively, and a valve for controlling the vacuum from the tank to the cylinders and from the engine to the tank, said valve being provided with means to simultaneously connect the engine intake to atmosphere and to apply vacuum to the tank and to simultaneously release the vacuum in the cylinder and connect the tank to the engine.

ROBERT W. AYER.